J. W. BRYCE.
METHOD OF SYNCHRONIZING CLOCKS.
APPLICATION FILED NOV. 19, 1918.

1,310,780.

Patented July 22, 1919.

Inventor
James W. Bryce
By his Attorney
Kerr, Page, Cooper & Haywood

J. W. BRYCE.
METHOD OF SYNCHRONIZING CLOCKS.
APPLICATION FILED NOV. 19, 1918.

1,310,780.

Patented July 22, 1919.
6 SHEETS—SHEET 3.

J. W. BRYCE.
METHOD OF SYNCHRONIZING CLOCKS.
APPLICATION FILED NOV. 19, 1918.

1,310,780.

Patented July 22, 1919.
6 SHEETS—SHEET 4.

Inventor
James W. Bryce
By his Attorneys
Kerr, Page, Cooper & Hayward

J. W. BRYCE.
METHOD OF SYNCHRONIZING CLOCKS.
APPLICATION FILED NOV. 19, 1918.

1,310,780.

Patented July 22, 1919.
6 SHEETS—SHEET 6.

INVENTOR
James W Bryce
BY
Kerr, Page, Cooper & Hayward
his ATTORNEYS

UNITED STATES PATENT OFFICE.

JAMES W. BRYCE, OF BINGHAMTON, NEW YORK, ASSIGNOR TO INTERNATIONAL TIME RECORDING COMPANY OF NEW YORK, A CORPORATION OF NEW YORK.

METHOD OF SYNCHRONIZING CLOCKS.

1,310,780.  Specification of Letters Patent.  Patented July 22, 1919.

Application filed November 19, 1918. Serial No. 263,132.

*To all whom it may concern:*

Be it known that I, JAMES W. BRYCE, a citizen of the United States, residing at Binghamton, in the county of Broome and State of New York, have invented certain new and useful Improvements in Methods of Synchronizing Clocks, of which the following is a full, clear, and exact description.

The invention, subject of this application for Letters Patent, is a new and improved method of synchronizing one or more secondary clocks in a system under the control of a master clock. It is more particularly designed for use with systems in which the controlling or synchronizing current is derived from an ordinary industrial or municipal power or lighting plant, in lieu of a storage battery or other unfailing source of energy, and more especially for those systems in which controlled clock mechanisms are employed to operate time recorders or similar devices which may impose a substantial load on the clock mechanism.

The primary objects of the invention are to so control the secondary clocks that they may be maintained in or brought to substantially perfect synchronism with the master clock from any condition of asynchronism within limits, whether they be initially out of step with the master clock or brought so by accident or design; to exercise synchronizing control in many different forms of system that is to say, whether the clock be mechanically or electrically driven, or partly so by each of said means; to provide for the use of either direct or alternating currents, not only for driving or winding but also for synchronizing the clocks, and to so organize the synchronizing means that even abnormal departures from true time in the secondaries are readily and quickly corrected.

In carrying out the objects above recited I have developed a system which secures numerous other and secondary advantages, for instance, the secondary clocks may be put in operation even before the wiring for the system has been installed, or any clock mechanism may be removed from the system and used independently, should the need for so doing arise, and owing to the fact that the units are interchangeable, the cost of manufacture and the degree of skill required in the maintenance of the system are very greatly reduced. Finally, the wiring is greatly simplified and the number of breaks between separating contact points necessary in such systems is reduced to a minimum and hence the cost of installation and upkeep is extremely low.

In the embodiment of the invention I have devised what I believe to be an entirely new method of synchronizing any number of secondary clock mechanisms with and through the instrumentality of a master clock. This method broadly stated involves the establishment on the line by the master clock and in each secondary clock of mutually coöperative electric conditions or relation for periods of substantial duration and in definite time relation. If the projected relations are preserved there will be no change of rate effected in the secondary clock, but should these relations be disturbed as will occur only when the secondary clock is not exactly on time, then in proportion to the departure from normal time relations, as by the overlapping of periods designed to occur at different times, or in general by the departure from the established conditions of definite phase, the master clock will retard the secondary, if it be too fast, or accelerate its rate if it be too slow, until the normal conditions of equilibrium are reëstablished and the secondary brought to exact synchronism.

This may be accomplished in various ways, all based upon this broad principle. For example, the master clock may connect to line a source of current for predetermined periods of definite and substantial duration in certain fixed relation to true time. The secondary clock may close for given periods in fixed relation to time, but as such time is indicated by its own hands, circuits to line from a means for retarding its rate and from a means for accelerating its rate, so that if these periods of closure overlap that of the master clock, as they will do only when the secondary is not on time, the master clock will operate the retarding means or the accelerating means, as the case may be, and thus bring the asynchronous secondary to correct or true time.

In this case the normal phase relations involve no overlapping of the periods of closure, but any other phase relations may be established by a departure from which a like result is accomplished. For example, the master clock may send to line for predetermined and definite periods a gradually varying current which is utilized to energize one side of a polarized differential relay in the secondary clock. In like manner and for the same interval or intervals the secondary clock may control the flow of a similar current through a local circuit including the other side of the relay. So long as the two currents are in phase and equal and opposite in their magnetizing effects upon the relay nothing happens, but if, during the periods of flow, one of the currents be stronger or weaker in magnetizing effect than the other, which would result should they not be in phase, then the stronger current will operate the relay and by its operation direct a current through the retarding or through the accelerating means in the secondary and thus bring the current flow back into phase and the secondary clock into synchronism.

Other means of accomplishing the same result in the same fundamental manner are possible, but in all cases included within the scope of my invention it is essential that the secondary clock be capable of running either at normal rate or at a retarded rate or at an accelerated rate, and the means for causing them to run at either of the latter are controlled by the master clock according to the time relations between the conditions which it sets up and that of those established by the secondary clock, so that should the latter be too fast the master clock retards its rate, or if too slow, accelerates its rate until it reaches synchronism, whereupon it continues to run at its normal or proper rate.

The means which I employ in carrying out the invention are illustrated in typical form in the accompanying drawings.

Many other forms of clock and specific means for carrying out the invention are possible, but those illustrated will serve to show its scope and general applicability.

Figure 1:
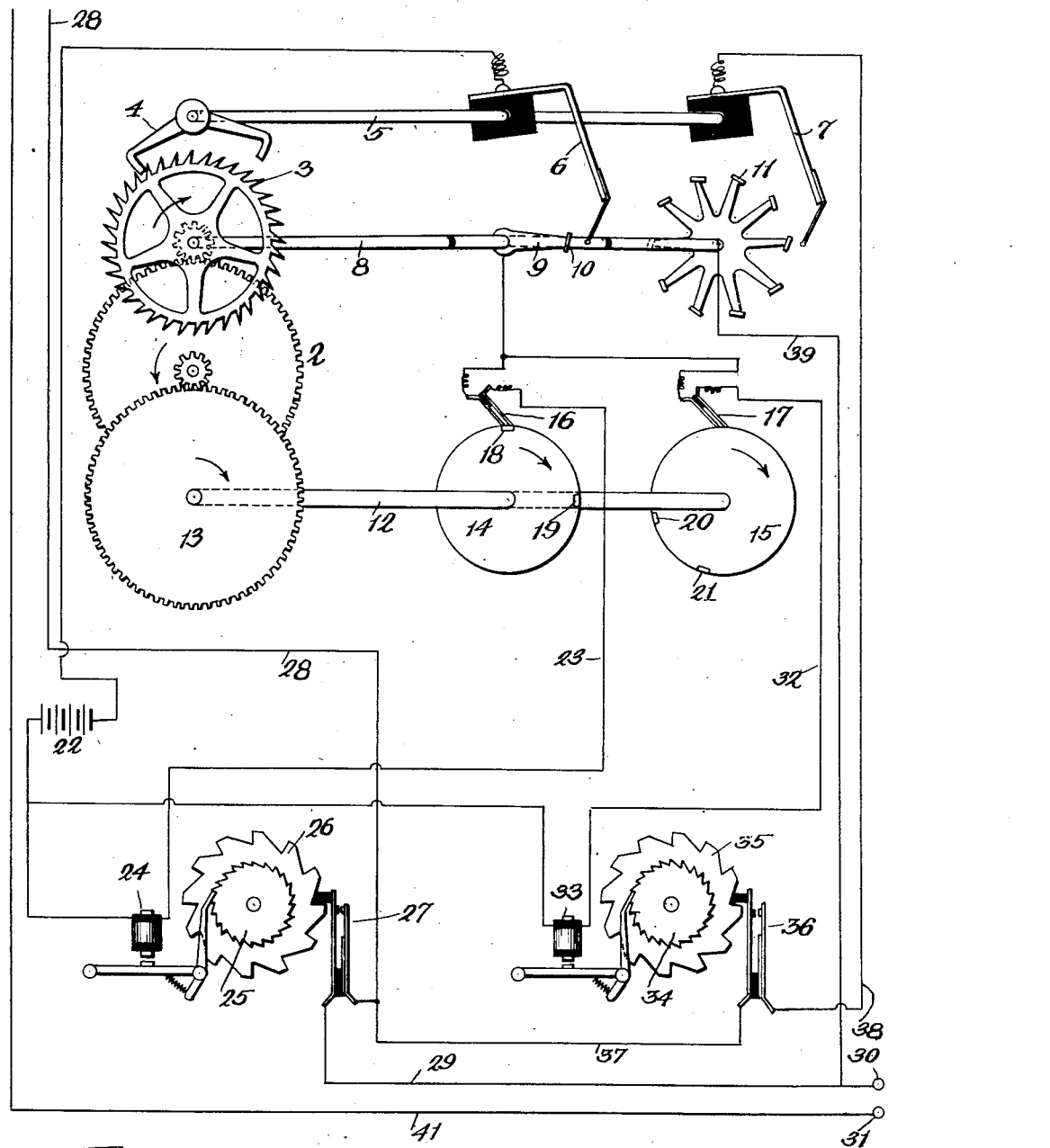
Figure 1 is a diagrammatic illustration of the more essential elements and the circuit connections of a master clock especially adapted for the purposes of the invention.

To gain preliminarily a clear understanding of the nature and functions of the master clock, reference may be had to Fig. 1. The numeral 2 indicates the clock train of such a mechanism, the driving means not being shown, as they are well known. The numeral 3 indicates the escape wheel of such a clock, assumed to have a sixty beat rate; 4 is the verge and 5 the shaft on which it is mounted, and 6 and 7 are contact fingers carried by this shaft.

The shaft of the escape wheel, diagrammatically shown, is marked 8, and carries an arm 9 with an inclined contact plate 10 at its end with which the finger 6 makes wiping contact once each minute. The shaft also carries a wheel 11 with a plurality of teeth, ten being a convenient number, each tooth having a similar end contact plate with which the finger 7 makes wiping contacts and at the rate of ten per minute.

Finally, the shaft 12 of the wheel 13, which revolves once an hour, carries two disks 14 and 15, upon the peripheries of which slide double contacts 16 and 17. In the disk 14 are set two conducting segments 19 and 18, the first of which comes under contacts 16, a given number of minutes, say fifteen, before the hour and the other 18, under the same contacts at the even hour. Similarly disk 15 has two conducting segments 20 and 21, the first of which comes under contacts 17 at, say, seventeen minutes after the hour and the other, say, twenty-seven minutes after the hour.

The verge shaft 5, oscillating sixty times in a minute as above stated, closes contact with the arm 9 once each minute and this completes a circuit which, for simplicity's sake, we have shown as running from a local battery 22, to one of the contacts 16, and as these contacts at that moment may be assumed to be on the segment 19, the circuit is continued through wire 23, back to the battery 22 through an electro-magnet 24.

An energizing impulse through this magnet operates to move a ratchet wheel 25, which in turn moves a larger ratchet wheel 26 one tooth and brings the high point of a tooth under one of two normally separate contacts 27, resulting in the completion of a circuit from wire 28 connected with or constituting the main operative circuit, to wire 29, and line terminal 30 to the secondary clocks, from which the path back is to the common return terminal 31 and wire 41.

The ratchets 25 and 26 remain in the condition to complete this circuit until by the movement of the hour shaft 12, contact 18 is brought fifteen minutes later or at the even hour under contacts 16. Thereupon the ratchets are moved to permit the contacts 27 to again separate, and to break the circuit to line. But then, after the lapse of seventeen minutes, the segment 20 is brought under contact 17, whereupon the circuit of the battery 22 is closed by wire 32 to an electromagnet 33, which operates ratchet wheels 34 and 35, similar to those above described, and closes the two contacts 36 which connect the main 28 and wire 37 with wire 38 to finger 7, so that each time the latter wipes one of the ten teeth of wheel 11, a line impulse is sent thereby through a wire 39 to line terminal 30 through the common return terminal 31 and wire 41.

The above described operation of the master clock continues at all times whether there be any current in the main line or not, and its effects will be understood from the description of the secondary clocks which now follows.

Figure 6:
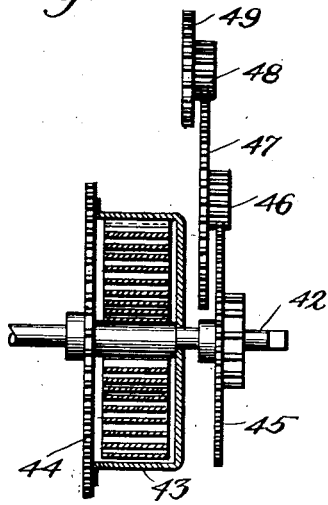
Fig. 6 is a section of the clock driving or winding mechanism on line 6—6 of Fig. 2.
Figure 7:
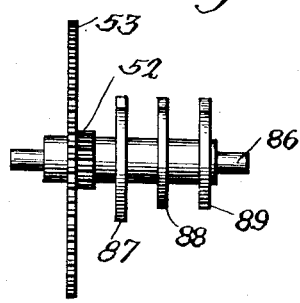
Fig. 7 is a detailed side view of the hour shaft of the clock mechanism showing three cams for controlling the same.

The construction of the secondary clock, except in the respects hereinafter pointed out, is or may be such as is ordinarily employed for driving recording mechanisms. In the main, each comprises a shaft 42 on which the main spring is mounted (Figs. 2 and 6), one end of such spring being connected to said shaft and the other to the drum 43 and gear wheel 44. Mounted fast on the shaft 42 is the gear 45, which with pinion 46, gear 47, pinion 48, and ratchet 49, constitutes the winding train of the clock mechanism.

In mesh with the gear 44 is the usual clock train driven thereby and comprising the pinion 50, the gear 51, the pinion 52, the gear 53, the pinion 54, the gear 55, the pinion 56 and the gear 57. A shaft 58, however, carries a differential gear which is peculiar to this device and is a feature of novel construction and function therein.

Figure 4:
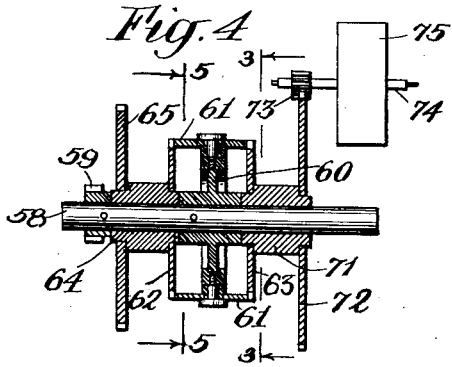
Fig. 4 is a cross-section of the same on line 4—4 of Fig. 2.
Figure 5:
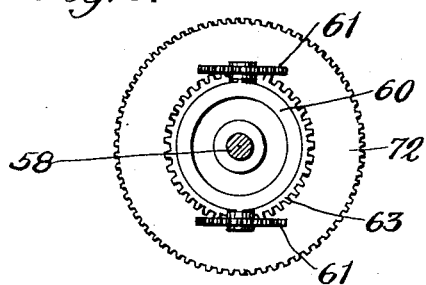
Fig. 5 is a section on the line 5—5 of Fig. 4.

On shaft 58 is mounted fast a pinion 59 (Figs. 2 and 4), and this meshes with the gear 57 of the clock train. On the same shaft is also mounted a bar or arm 60 in the opposite ends of which are set the floating differential gears 61. It will be understood that while two such gears 61 are shown one only need be used, if so desired. These gears mesh with the gears 62 and 63 at right angles thereto, the former of which is fast on a hub 64, which is loose on shaft 58, and carrying a gear 65, which is fast to said hub, which meshes with a pinion 66 on the shaft 67 of the escape wheel 68.

The escape wheel 68 has a verge 69 cooperating with it and a balance wheel 70, the main spring of which is not shown in the drawing, but these parts are of the ordinary and well known construction.

The second gear wheel 63 is mounted on a hub 71, loose on shaft 58, which has a gear wheel 72 secured to its end, said gear wheel meshing with a pinion 73 mounted on a spindle 74 carrying a fan 75.

In addition to the purely mechanical parts above described, the following electrical elements complete the organization of the clock mechanism. A magnet 76 connected with wire 77 from the binding post 30 operates an armature 78, carrying a pawl 79 and when an impulse of current energizes the said magnet, the ratchet wheel 49 is moved one step, so that a succession of impulses through the magnet will wind up the clock.

Connecting with the same circuit is also a magnet 80 operating an armature 81 carrying a pawl 82, which, when the magnet is energized, is withdrawn from engagement with the fan 75 and leaves it free to revolve, and the clock spring to unwind with relative rapidity and the clock to be advanced at a corresponding rate.

Again, a magnet 83, also connected with the circuit of wire 77 operates an armature 84 which carries at its end a brake shoe 85 which, when the magnet is energized, presses against the balance wheel 70 and stops the same, and which, upon the demagnetization of the said magnet, slides off from the periphery of the wheel and gives it a slight impulse to start it immediately in motion again.

The operation of the system is as follows: The shaft 86 of the pinion 52 rotates once an hour and this shaft carries three cams, 87, 88 and 89. Cam 87 may be designated as the retarding cam, for it has a cut-away portion which permits a contact 90 that slides over its periphery to drop, when it meets the cut-away part, and comes into engagement with a second contact 91 and closes a circuit from binding post 31 through wires 92 and 93 to and through the electro-magnet 83 that stops the clock movement. Cam 88 may be termed the accelerating cam, for it has a raised portion which, at a certain moment, raises one of a pair of contacts 94 into engagement with the other, and thereby completes the circuit from binding post 31 through wire 95, to and through the magnet 80 that releases the fan 75 meshing with gear 72 of the differential and hence permits the clock mechanism to run faster and ahead.

It will be recalled that in the description of the master clock it was shown that at fifteen minutes before the hour, by the conjoint action of the finger 6, the conducting segments in the disk 14 and the magnet 24, the main current was sent to line through binding post 30 for fifteen minutes or until the even hour when magnet 18 in disk 14 operated to interrupt this flow of current. If, therefore, the secondary clock mechanism is exactly on time at the hour, and the contacts 90 and 91 come into engagement at the moment when the current to binding post 30 is interrupted by the master clock, no current will flow through magnet 83 and the clock mechanism will not be stopped. So also if the secondary clock be slow, the contacts 90 and 91 will not have dropped into the cut-away part of the disk 87 until after the master clock has interrupted the circuit to magnet 83.

On the other hand, assume that before the master clock interrupts this circuit on the even hour, the secondary clock being fast has permitted the contacts 90 and 91 to come together, then the circuit through magnet 83 will be closed and the secondary clock will be stopped until the master clock has caught up with it.

Out of abundant precaution this may be illustrated by an example. Assume the secondary clock to be eight minutes fast or ahead of the master clock, then its cam 87 will permit the contacts 90 and 91 to come into engagement at the instant when it reaches the even hour position of its own hands and the circuit through magnet 83, which is closed by the master clock fifteen minutes before the hour, will keep the balance wheel stationary until the master clock reaches the true hour position and breaks the circuit of magnet 83.

Synchronism is thus established, but it will be observed that the means that have brought this about are operated only when the secondary clock is too fast, or in other words that they constitute a retarding means only; another means for synchronizing, when the secondary is slow, is therefore required.

Cam 88 has high and low parts on the periphery, the high part of which brings contacts 94 together and the low parts allow them to separate. The parts are so arranged that the contacts are brought together at thirty minutes after the hour, as shown by the hands of the secondary clock and separate at exactly fifteen minutes of the hour.

Now, if the master clock sends current to binding post 30 from exactly fifteen minutes of the hour to the even hour, the secondary clock, if in exact time, will separate the contacts 94 at the instant when the master clock throws on the current and nothing will happen. So, also, if the secondary clock is fast, the contacts 94 will have separated before the master clock current is established, and nothing will happen. If the clock be slow, however, the circuit will be closed through contacts 94 and magnet 80 and the fan mechanism will be released and the secondary clock will rapidly advance, because nothing but the fan resists unwinding, to a position which indicates fifteen minutes of the hour before the contacts drop off the raised part of the cam and separate. The secondary will then agree with the master clock.

It requires but a brief time to accomplish this and, while it is not theoretically perfect synchronism the interval is such a minute fraction of a minute that it is of no commercial importance. By means of proper devices operating under this principle, however, theoretically perfect synchronism is readily obtainable. Where exact synchronism is not secured as by the means now in question, the secondary clock, if so desired, may be made to synchronize a trifle fast, and be corrected and set in true synchronism at the hour position. It is not thought necessary, in view of the above, to give a specific example to illustrate the action occurring when synchronizing for slowness.

While the winding of the secondary clock is not a matter with which this invention is directly concerned, I have shown the means which I prefer to use in the system thus far described. It has been explained that at seventeen minutes past the hour the circuit from the main line was closed for ten minutes through the contacts 36 and finger 7. For ten minutes during each hour, therefore the finger 7 will send through the teeth of wheel 11 momentary impulses of current to the binding post 30, and to the secondary clock. These impulses received by the corresponding terminal of the secondary clock pass through the wire 77 the electro-magnet 76 and wire 96 to the normally separated contacts 98, which when closed by a projection 99 on cam 89 for a corresponding interval of ten minutes, complete the circuit to the common return. The magnet 76 will therefore during each hour receive one hundred impulses, each one of which is designed to wind the spring of the secondary clock an amount sufficient to run it for two minutes, which is more, under normal circumstances, than enough to keep it fully wound up. This is so that the clock may make up any loss of winding it may have suffered at some previous hour when the current may have been shut off.

Figure 8:
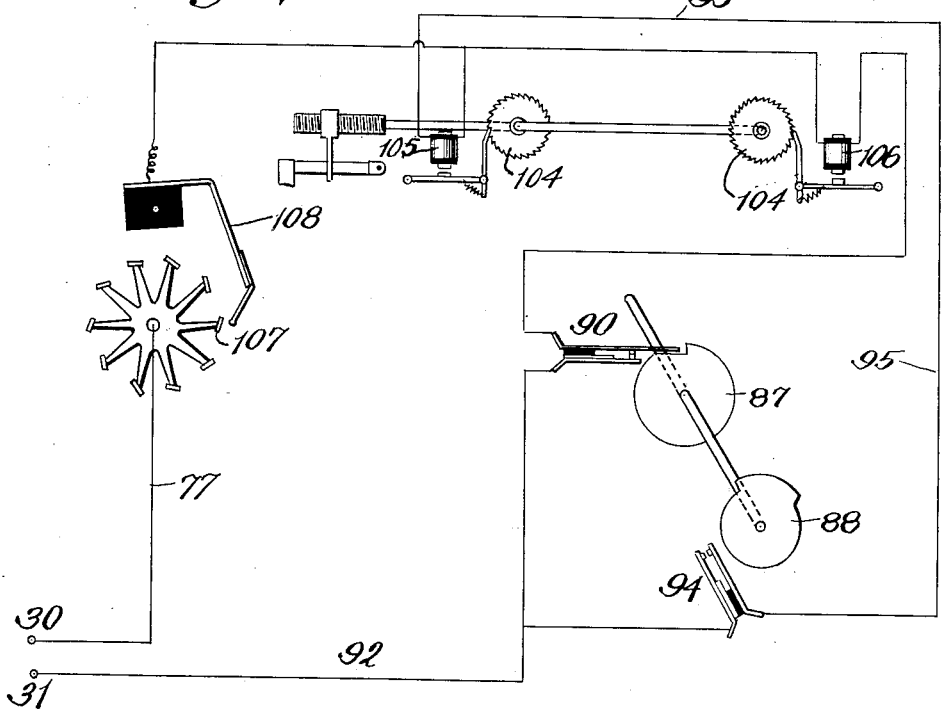
Fig. 8 is a diagram showing a pendulum clock controlled by my new method.
Figure 9:
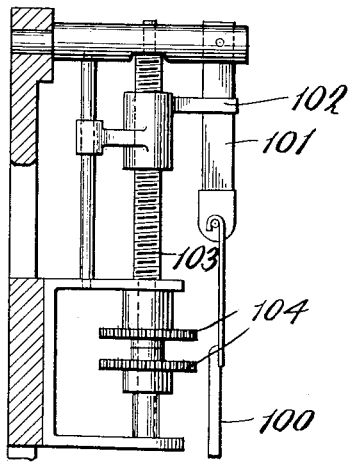
Fig. 9 is a detail illustrating the means for varying the length of the pendulum.

In Figs. 8 and 9 I have shown another means for carrying out the invention, the clock in this case being a pendulum clock, which is accelerated or retarded in its rate by varying the length of the pendulum. Obviously if the clock regulator were a hair spring and balance wheel, the effective length of the spring might be varied by similar means to secure the result.

In Fig. 9 the pendulum 100 is suspended by a flexible metallic strip 101, and its length is varied by a bifurcated arm 102 which embraces the strip 101 and is mounted on a screw spindle 103, and is prevented by suitable means from turning or moving except vertically. The screw spindle 103 is adapted to be rotated step by step in opposite directions by two ratchets 104, with which engage pawls operated by electro-magnets 105, 106, which magnets are in branches of the circuit from binding post 30, through wires 93 and 95, respectively, and the contacts which are controlled by disks 87 or 88.

Figure 2:
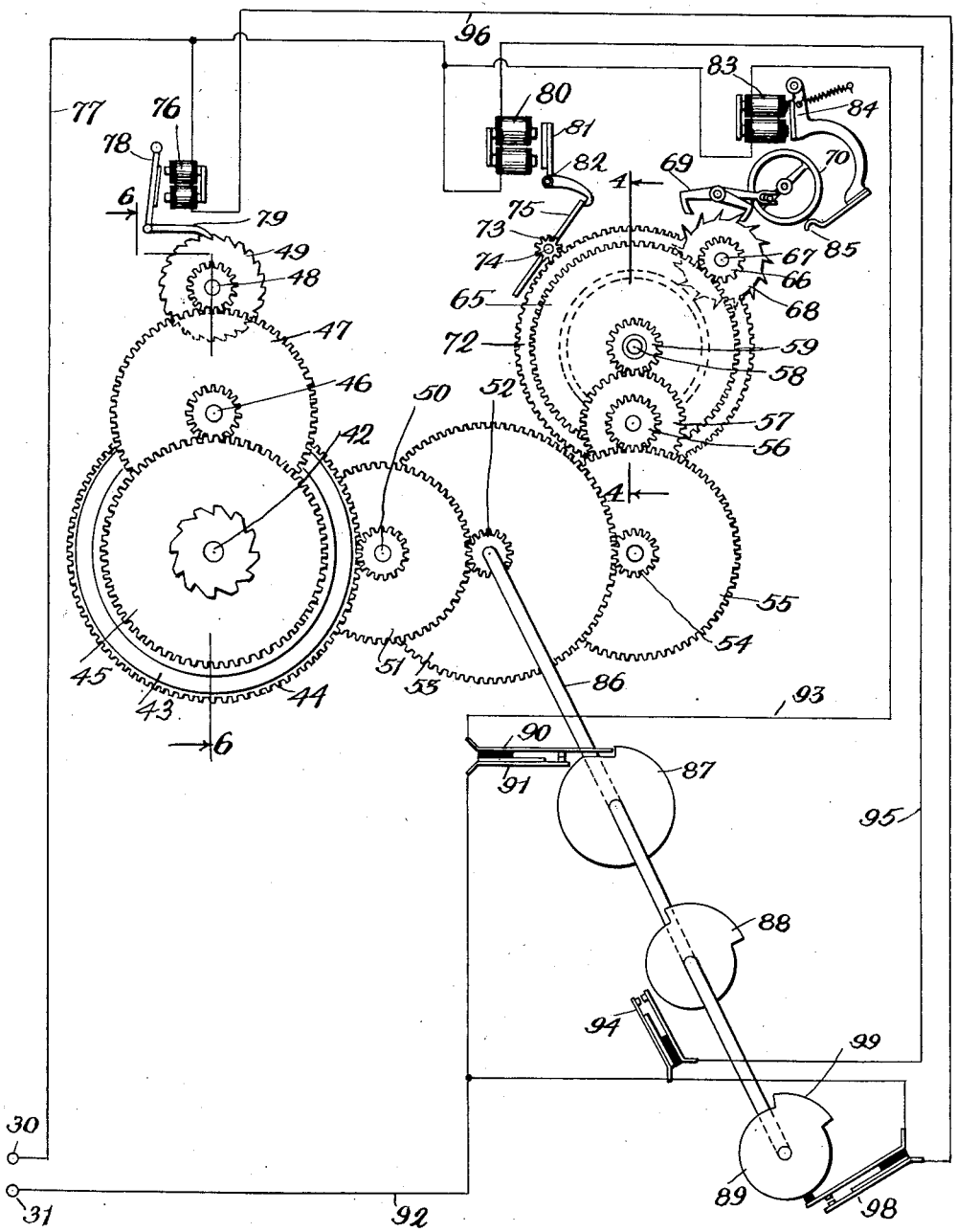
Fig. 2 is a similar view of the controlled clock mechanism and its wiring.
Figure 3:
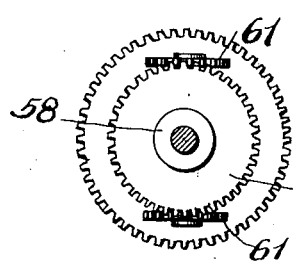
Fig. 3 is a detailed section of a differential gear forming part of the controlled clock mechanism and taken on line 3—3 of Fig. 4.

There is also in the main part of this circuit a ten toothed contact wheel 107 on the minute arbor of the secondary clock, with which an arm 108 on the verge shaft makes wiping contacts, so that when a current is flowing from fifteen minutes of the hour to the even hour from the master clock and contacts 90 and 94 are closed, this current will be broken up into impulses which will operate the magnets 105 or 106, as the case may be, and thus shorten the pendulum of the secondary clock if it be too slow, or lengthen it if it be too fast, in the same manner as has been set forth in connection with the clock of Fig. 2.

Figure 10:
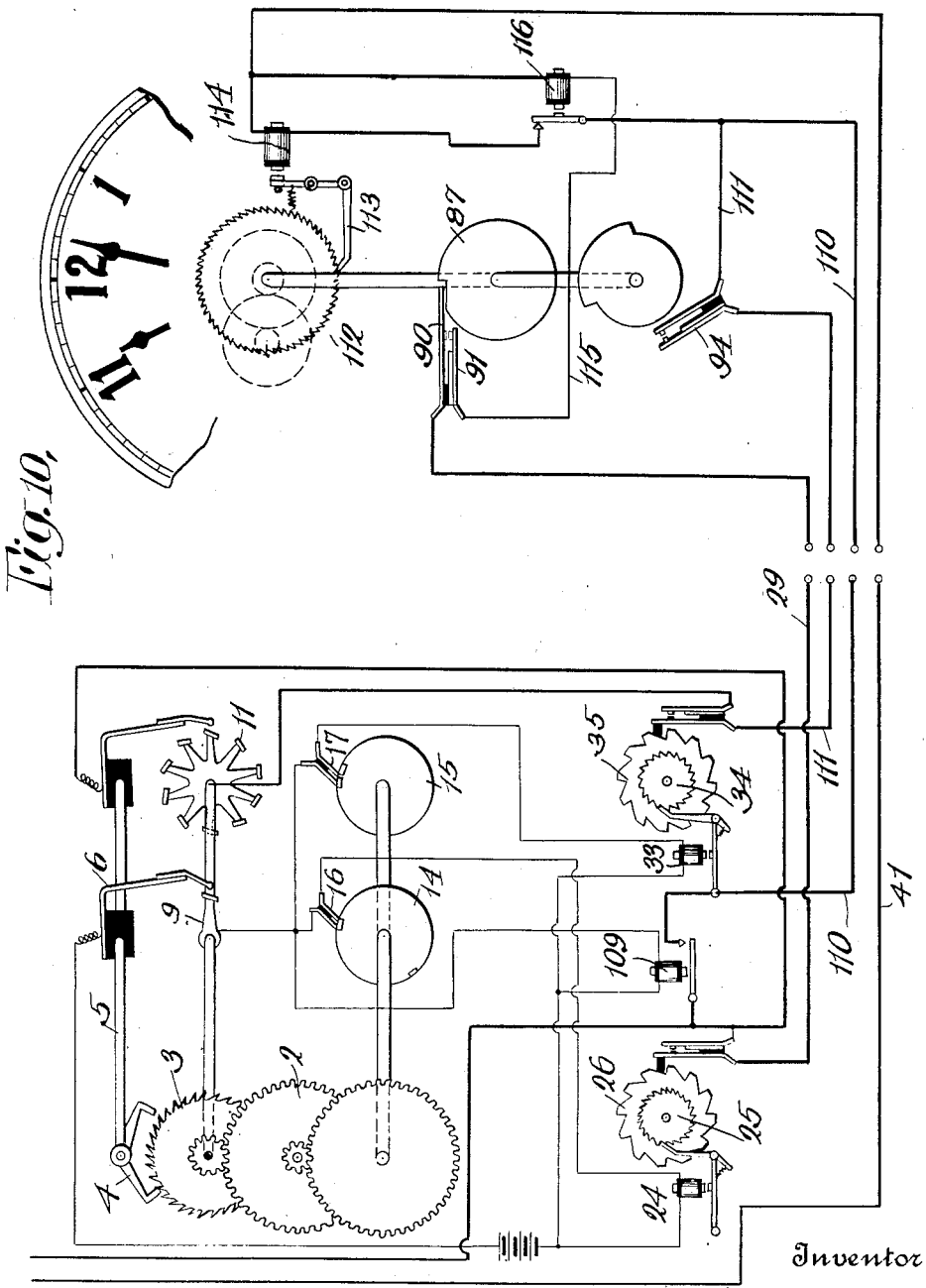
Fig. 10 is a diagram of an impulse clock adapted for synchronizing control in accordance with my invention.

In further illustration of the invention, let it be assumed that the system is an impulse system, that is to say, that the secondary clocks are operated by electrical impulses sent out periodically, say once a minute by the master clock. Even to such a system the method of synchronizing is applicable, as may be seen from a consideration of Fig. 10.

On the left of this figure is shown the master clock, which in all respects is the same as that shown in Fig. 1, except that once in each minute when contact is made between the arms 6 and 9, the circuit is closed through an electro-magnet 109 that momentarily makes the circuit from the same over wires 41 and 110 that transmit to the secondary clock the driving impulses that operate them. Again, the ten impulses of current from the wheel 11 are transmitted over another wire 111 by means of the circuit controlling ratchets 34 and 35, and these more rapid impulses are utilized when necessary for advancing those secondary clocks that may be too slow.

Referring now to the secondary clock illustrated at the right of the figure, the clock is driven by a sixty toothed ratchet 112, with which engages a pawl 113 operated by an electro-magnet 114. This magnet is in the circuit of wire 110 and receives sixty impulses of current an hour, or one each minute, and moves the hands of the clock accordingly.

On the hour shaft of the secondary clock the disk 87 permits the contacts 90 and 91 to come together at the even hour, as indicated by the hands of the clock. Therefore, if the master clock sends a current into the line 29, from fifteen minutes of the hour to the even hour, this current, if the secondary be too fast, will pass through the wire 115, from the contacts 90 and 91, and energize an electro-magnet 116. This breaks the circuit connected with wire 110, which contains the magnet 114 and maintains that circuit interrupted until the master clock, having reached the even hour, interrupts the circuit of magnet 116 and permits thereafter the impulses of current over wire 110 to operate the clock.

On the other hand, if the secondary clock be slow, the contacts 94 close the circuit over wire 111 and the magnet 114 receives ten impulses of current per minute in lieu of one and the clock is thereby advanced.

Figure 11:
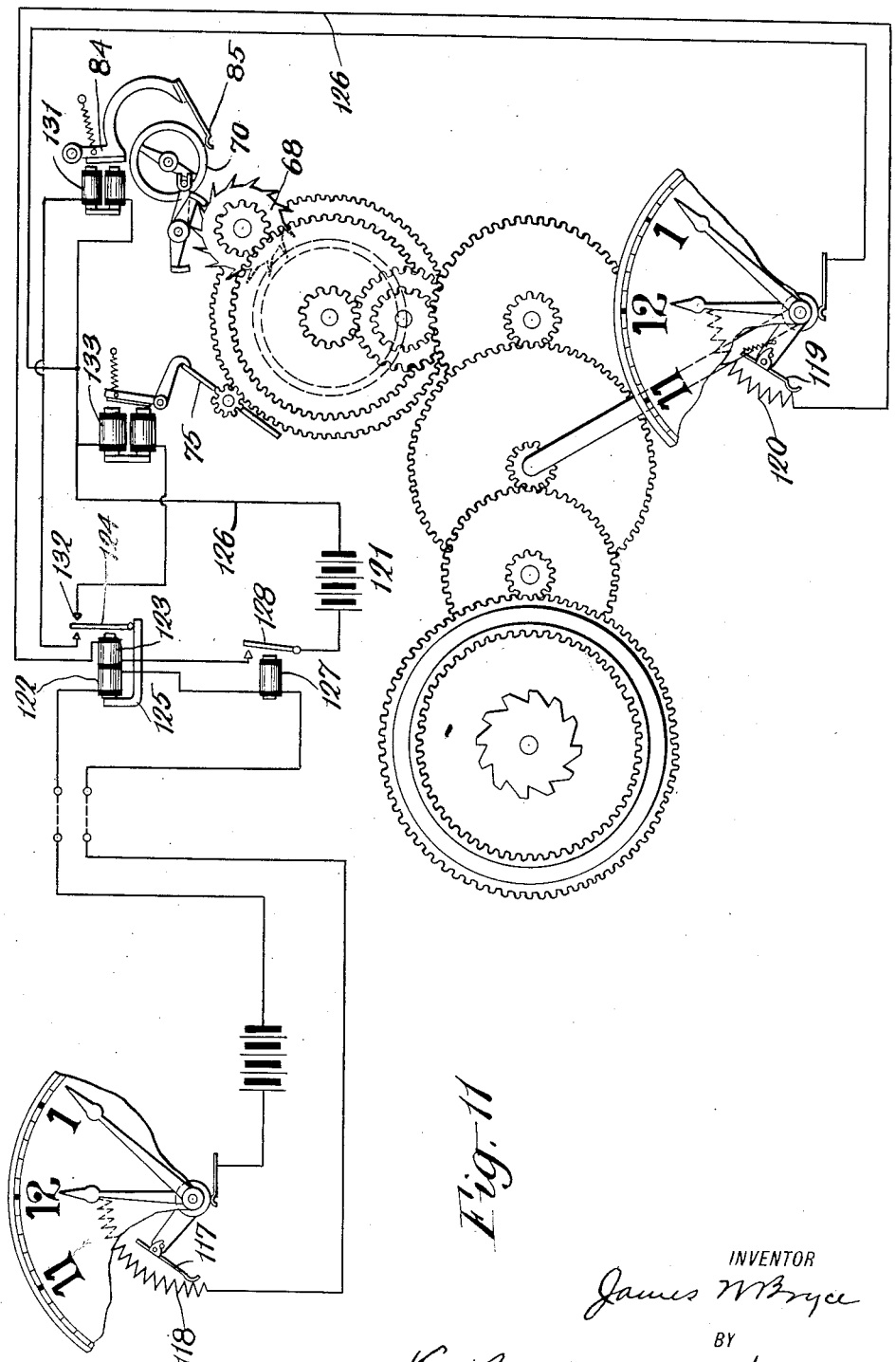
Fig. 11 is an illustration of a further modification of the system.

Still another means by which the invention may be carried out is shown in Fig. 11, in which a master clock is shown at the left and a secondary to be controlled thereby at the right. In the master clock there is shown a means for sending a varying current to line for any predetermined period. This comprises a contact arm 117 mounted on one of the driven shafts, such, for example, as the hour arbor, and arranged to sweep over the plates of a rheostat 118 in the main line circuit. By this means the master clock sends to line for any desired interval a current which may be assumed to start its flow at maximum and to gradually weaken to any desired point by the inclusion in the circuit of a gradually increasing resistance.

In each secondary clock the same or any similar means is used, that is to say, a contact arm 119 on the hour arbor, a rheostat 120 and any source of current 121. This source of current may be the same as that which sends to line, or it may be any other, either of the same voltage or any other, provided that the variation thereof be in the same direction and in exact proportion, as the neutralizing effects in such case may be secured by windings and other well known means.

In each secondary clock is a differential polarized relay having two energizing coils 122, 123, and an armature 124, pivoted to the permanent magnet 125 forming part of the magnetic circuit of the instrument. The connections of the coils, the former of which is in the main line and the latter in a local circuit 126 are such that the two currents neutralize each other's effects or are opposed. If therefore the two currents are equal or alike in their magnetizing effects the armature 124 is not moved, but if the current in coil 123 be the stronger, then, say, a north pole will be produced in the free end of the core, and the armature will be attracted. If, however, the current in coil 122 preponderates in strength, then the armature, under the influence of a south pole, will be repelled.

Normally, the local circuit 126 is interrupted, but when a current flows over the line, an electro-magnet 127 therein closes this circuit by its attraction for an armature 128.

The driving train of the secondary clock contains a differential gear such as described in connection with Fig. 2 and with it are connected in the same manner a fan 75 and a balance wheel 70. These parts being arranged as shown and assuming that the secondary clock is exactly on time, the current which it sends through the local circuit 126 will be exactly in phase with that sent to line by the master clock, and hence the relay will not be influenced, notwithstanding that both currents are continuously varying in strength. But let it be assumed that the secondary is ahead of time, then it sends its current through relay 131 that attacts an armature 84 carrying the frictional brake 85 that stops the balance wheel 68 and therefore the clock, until the line current has reached the strength that neutralizes the action of the relay, whereupon the clock is started in synchronism with the master clock.

Should the secondary be too slow then the opposite effect is produced. That is to say, the line current will preponderate, the armature of the polarized relay will be repelled against a stop 132 and current will be sent through a relay 133 which operates to release the normally locked fan 75 thus permitting the clock to speed up until its current neutralizes that of the line, whereupon the fan is again locked and the clock continues to run under the control of its escapement.

In the system illustrated in Fig. 11 it will be observed that the means for maintaining in the secondary clock the mutually coöperative relations necessary for synchronism are purely electrical. This is not however necessary, as they might be either mechanical or partly electrical and partly mechanical provided the ultimate result were the same.

Many other ways of applying the invention are possible, but the above illustrations will suffice to show the wide possible variation of the system with which it may be used.

In practice the arrangement of contacts is such as to provide for errors or departures from synchronism far greater than would ordinarily be likely to occur, but this will be understood as a mere safe-guard or matter of convenience unattended with any disadvantages. The time intervals, for example, for closing the circuit are not only arbitrarily fixed in duration, but they may occur at other parts of the hour or more or less frequently. These are matters, however, that those skilled in the art will readily understand.

It is not new to advance or throw back the hands of a secondary clock at predetermined intervals for the purpose of synchronizing, but in no case, of which I am aware, has any provision been made for varying the rate of a secondary clock or for correcting anything but relatively minute errors of time, and no such method of synchronizing as mine has ever been employed.

Having now described my invention, what I claim is: —

1. The method of synchronizing a secondary with and by the action of a master clock which consists in connecting by the master clock to the line running therefrom to the secondary clock, a source of current at predetermined periods of definite and substantial duration, establishing in and by the secondary clock, for periods of given and substantial duration in definite time relations to those in which the source of current is connected to line by the master clock, electrically coöperative relations with the master clock, and when such time relations are disturbed by the secondary clock gaining or losing time as indicated by its hands, varying continuously by the action of the master clock current the rate of the secondary to an extent which brings both clocks into exact accord, retarding such rate, if the secondary be too fast, or accelerating the rate if it be too slow, until synchronism is attained.

2. The method of synchronizing a secondary with and by means of a master clock, which consists in connecting to line from and by the master clock a source of current for predetermined and definite periods of substantial duration, establishing in and by the secondary clock electrical coöperative relations with the master clock for definite periods in predetermined time relation to the periods of connection of the current source by the master clock, as such time may be indicated by the hands of the secondary clock, and when such time relations are disturbed retarding or accelerating the rate of the secondary to an extent proportional to that of the departure from such time relation, whereby the secondary will, by the action of the current established by the master clock, be retarded, if too fast, or accelerated, if too slow, and conditions of synchronism thereby established.

3. The method of synchronizing a secondary clock with and by means of a master clock, which consists in establishing in the secondary clock by the conjoint action of the master and the secondary clock at predetermined periods of definite and substantial duration and in fixed time relation as indicated by the hands of the respective clocks, electrical relations which when the said time relations are disturbed and the secondary clock is too fast or too slow, will by their conjoint effect retard or accelerate the rate of the secondary clock until it is brought into synchronism with the master clock.

4. The method of synchronizing one or more secondary clocks by a master clock which consists in connecting by the master clock a source of current to the circuit from the master to the secondary clocks for given and predetermined intervals of substantial duration, and connecting with such circuit means in the secondary clocks for retarding or for accelerating their rate for given intervals predetermined by reference to the time indicated by the hands of the secondary clocks, whereby, when such intervals overlap, the current transmitted by the master clock will pass to the retarding or to the accelerating means according to whether the secondary clocks be too fast or too slow and operate the same until the secondary clock is brought into synchronism with the master clock.

5. The method of synchronizing one or more secondary clocks by a master clock which consists in connecting by the master clock at predetermined intervals of definite and substantial extent, a source of current to a line running to the secondary clocks, and continuously operating by such current means for retarding or means for accelerating the rate of the secondary clocks to an extent proportional to the departure from true time as indicated by the hands of the secondaries or until the said secondaries are brought into synchronism with the master clock.

6. The method of synchronizing one or more secondary clocks by a master clock which consists in sending from the master clock at predetermined intervals of definite and substantial duration an electric current to the secondary clocks, closing circuits for given intervals in the secondary clocks in definite relation to the time indicated by the hands thereof, and directing the current from the master clock over such closed circuits during the periods as the said intervals may overlap, and thereby continuously operating in said closed circuits means connected therewith for retarding or means for accelerating the rate of said clocks, according as the clock may be too fast or too slow until the said clocks are brought into synchronism with the master clock.

In testimony whereof I hereunto affix my signature.

JAMES W. BRYCE.